(12) United States Patent  (10) Patent No.: US 7,461,615 B2
Albright  (45) Date of Patent: Dec. 9, 2008

(54) PET HARNESS WITH RETRACTABLE LEASH

(76) Inventor: Brenyn Albright, 6802 E. Joan De Arc Ave., Scottsdale, AZ (US) 85254

( * ) Notice: Subject to any disclaimer, the term of this patent is extended or adjusted under 35 U.S.C. 154(b) by 43 days.

(21) Appl. No.: 11/424,316

(22) Filed: Aug. 15, 2006

(65) Prior Publication Data

US 2008/0072846 A1  Mar. 27, 2008

(51) Int. Cl.
A01K 27/00 (2006.01)
B65H 75/34 (2006.01)
B65H 75/30 (2006.01)

(52) U.S. Cl. ................ 119/794; 242/385

(58) Field of Classification Search ........... 119/794, 119/796; 242/385, 385.3, 385.4, 396.1, 396.3, 242/396.4, 384.7
See application file for complete search history.

(56) References Cited

U.S. PATENT DOCUMENTS

| 4,328,766 | A | 5/1982 | Deibert |
| 5,471,953 | A | 12/1995 | Sporn |
| 6,581,547 | B1 | 6/2003 | Austin |
| 6,694,923 | B1 | 2/2004 | Fouche |
| 2004/0154556 | A1* | 8/2004 | Masterson et al. ......... 119/794 |
| 2005/0211189 | A1* | 9/2005 | Price ......................... 119/794 |
| 2006/0236956 | A1* | 10/2006 | Lord .......................... 119/794 |

* cited by examiner

*Primary Examiner*—Michael R. Mansen
*Assistant Examiner*—Monica L Williams
(74) *Attorney, Agent, or Firm*—Angela M. Brunetti

(57) ABSTRACT

A harness with a retractable leash secured on the harness so that it remains in a fixed location on an animal's back, making it comfortable for the animal, yet always accessible for a user. The animal can freely move about without being encumbered by the leash, and the leash remains easily accessible by the user on the animal's back, even when not in use. A locking feature will maintain the leash to a predetermined length when the leash is being used.

6 Claims, 4 Drawing Sheets

PET HARNESS WITH RETRACTABLE LEASH

TECHNICAL FIELD

The present invention relates generally to a harness for a pet, and more particularly to a pet harness with a retractable leash.

BACKGROUND OF THE INVENTION

Walking a pet can become a cumbersome task when one is confronted with the need to locate a leash and attach it to a collar. This can also be complicated when the leash is separate from the collar and has to be carried or stored when not being used, yet accessible to easily attach to the leash when necessary. Many cities have laws that require pets be on a leash at all times, which makes the accessibility of the leash even more important.

One solution is to keep the leash attached to the collar at all times. However, many times this is cumbersome for both the animal and the user. The dangling leash can prevent the animal from easily moving, or it can get tangled around the animal and possibly cause injury. Retractable leashes are common, but are removably attached to a pet collar. The leash is temporarily attached to the collar and removed when it is not in use. Therefore, they must be carried when they are removed from the animal. Typically, the leash mechanism is located in the leash handle, and causes the case to be heavy and cumbersome. It is awkward to carry around when it is not attached to the animal and is likely to burden the animal if it is left hanging from the collar. Likewise, collars with retractable leashes built therein are also heavy and cumbersome around the animal's neck. They are often weighted in the area where the leash is stored causing them to hang on the underside of the animal's neck making them difficult to access and causing discomfort for the animal.

There is a need for a pet restraint that is easily accessible by a user while being comfortable and safe for the animal.

SUMMARY OF THE INVENTION

The present invention is a harness with a retractable leash secured on the harness so that it remains in a fixed location on the animal's back, even when the leash is not in use, making it comfortable for the animal, yet accessible for the user. The harness of the present invention has a housing mounted thereto with a retractable leash system enclosed within the housing. The housing for the retractable leash system is mounted to the harness and holds a coiled spring with a leash surrounding a spool. A saddle portion allows permanent attachment of the housing and leash assembly to the harness. The harness is easily removed from and/or attached to the animal. The leash has a low profile handle attached thereto and the leash length is adjustable as desired by the user by way of the coiled spring and spool.

In another embodiment of the present invention, a locking feature allows the user to maintain the leash at any desired length. The locking feature allows the user to set the leash to a desired length, lock the leash in place, and the leash will be maintained at the desired length until the locking mechanism is released.

When the leash is not being used, it is coiled within the casing and the handle is secured against the casing. The leash remains attached to the animal, readily accessible by the user, and is kept out of the animal's way. Therefore the animal can freely move about while wearing the harness being unencumbered by the leash while the leash remains easily accessible by the user on the animal's back.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
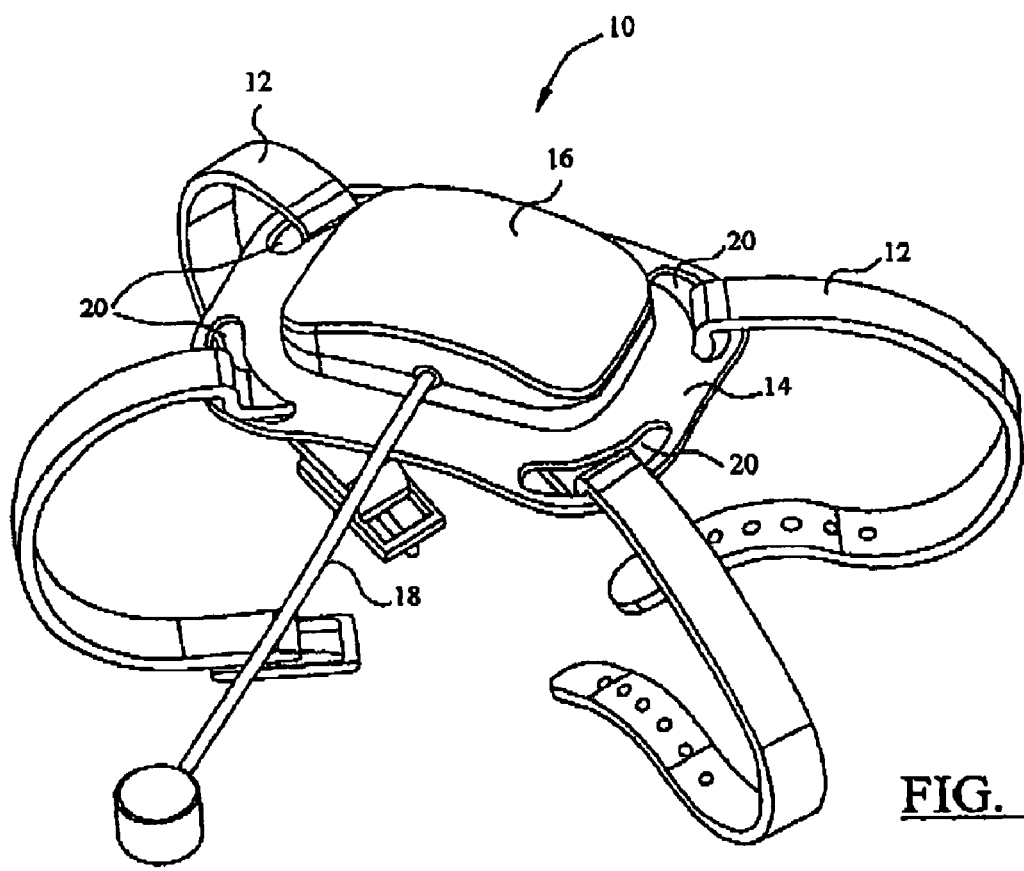
FIG. 1 is a view of the harness with a retractable leash system of the present invention.

FIG. 1 is a diagram illustrating the retractable leash harness 10 of the present invention. A strap system 12 is used to attach the harness to an animal, not shown. The strap system 12 is a plurality of straps, (two straps are shown in FIG. 1), that are fed through a saddle 14. The saddle 14 serves as a base for removably attaching the straps 12. The straps are attached to an animal's back such that they are fastened on the underside of the animal and the straps remain behind the animal's neck and shoulder area. Therefore, the weight of the harness and any attachments is maintained on the animal's back. Preferably, the straps 12 have adjustable fasteners in order to accommodate different sized animals. The straps can be any material that is both flexible and strong, such as leather or a synthetic material.

A housing 16 is mounted to the saddle 14 such that it is permanently attached to the saddle 14. The housing 16 holds a retractable leash system 18 that has a mechanism to allow a leash to extend to any desired length while in use. The leash is coiled and stored within the housing 16 while it is not in use, yet it remains attached to the saddle 14 and accessible to a user at any time while an animal is wearing the harness 10. The saddle 14 has slots 20, preferably in each corner of the saddle 14 for receiving the plurality of straps 12 that constitutes the harness 10.

Figure 2:
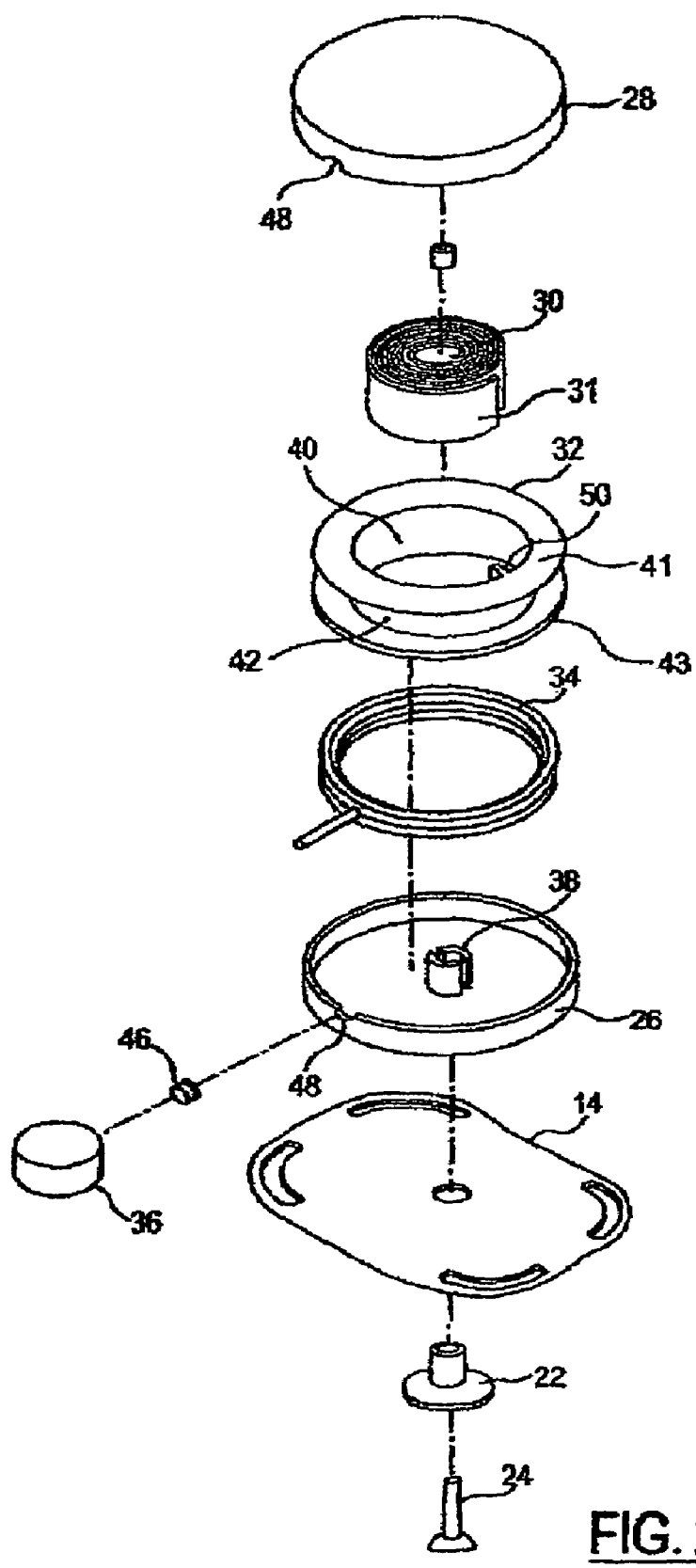
FIG. 2 is an exploded view of the present invention.

Referring now to FIG. 2, an exploded view of the present invention is shown. It should be noted that the shape and configuration of the housing can vary significantly from the shapes and configurations shown in FIGS. 1 through 8 without departing from the scope of the present invention. FIGS. 1 through 8 are for example purposes only and in no way limit the present invention. For example, a rectangular housing 16 is shown in FIG. 1 and a round housing is shown in FIG. 2. In any event, it is preferable that the housing has a low profile so that it doesn't interfere with the animal's comfort and movement. The housing can be of any material that is both durable and lightweight, such as plastic.

In FIG. 2, the housing is shown in two pieces, a base portion 26 and a top portion 28 that attach together to form an assembly housing for enclosing the retractable leash system. A single fastener 24 is shown in FIG. 2 and is used to attach the housing portions to each other. However, it should be noted that a plurality of fasteners may also be used to attach the top and base portions 28, 26 of the housing to each other and to attach the housing to the saddle 14 without departing from the scope of the present invention. The base portion 26 of the housing is attached, in a permanent manner, to the saddle 14 by way of an attachment or fastener, such as a post 22 and rivet 24, or screw and washer, or similar attachment. It should be noted that one skilled in the art is capable of attaching the housing to the saddle 14 in many possible configurations and the particular attachment method shown in FIG. 2 is for example purposes only.

The permanent attachment is for the purpose of mounting the housing in place on the saddle 14 so that the leash system is always accessible. The housing is not easily removed from the harness assembly. The leash remains attached to the saddle 14 at all times and therefore remains accessible to a user whenever the saddle is attached to the animal. The saddle 14 and strap system (not shown in FIG. 2) are arranged so that the housing portions 26, 28 stay on the animal's back, keeping it accessible to the user, but out of the animal's way.

The retractable leash system has a concentrically coiled spring 30, a spool 32, a cord or leash 34 having a predetermined length, and a handle member 36. In the example shown in FIG. 2, the handle member 36 is attached to one end of the cord 34, as by grommet 46, and the other end of the cord 34 is attached to the spool 32. It should also be noted here that there are many possible configurations for attaching the handle to the cord, as well as attaching the cord to the spool and the particular configuration shown in FIG. 2 is for example purposes. The housing 26, 28 completely encloses the retractable leash system, and has an opening 48, or notched portion in the top portion, the bottom portion, or both portions as shown in FIG. 2, so that when the top and bottom portions are assembled to each other, the notches 48 produce a complete opening for the cord 34 to extend out of. The handle member 36 is located outside of the housing.

The handle member 36 allows a user to grip the leash when in use. The handle member also prevents the cord 34 from fully retracting into the housing, thereby keeping the cord 34 accessible by the handle member 36 at all times. The handle member 36 is flush with the housing when it is not in use so as not to interfere with the animal's movement.

The spool 32 is centered in the housing and the spring 30 is centered in the spool 32. The spring 30 is maintained at the center of the housing by a stabilizer post 38. In the example shown in FIG. 1, the stabilizer post 38 is molded as part of the top and base portions, 28, 26 of the housing. It should be noted that it is possible to maintain the stabilizer post on one or the other portions of the housing as well without departing from the scope of the present invention. In FIG. 2, the stabilizer post is also the connection point for the fastener 24.

The spool 32 has an inner diameter 40 and an outer diameter 42 with top and bottom flanges 41 and 43 of the spool that are larger in diameter than the inner and outer diameters of the spool. The spring 30 is located within the inner diameter 40 of the spool and the cord 34 is wound around the outer diameter 42 of the spool 32. The spool 32 and spring 30 are arranged such that the cord 34 can be extended or retracted to any length desired by a user. The spring 30 is a coiled spring that expands when the cord 34 is extended and a catch 50, or protrusion on the inner diameter 40 of the spool 32 contacts an edge 31 of the spring 30. The spring 30 contracts when the cord 34 is retracted. The cord 34 is coiled around the spool 32 when it is fully retracted and not being used. Any suitable mechanism, such as the catch 50 as shown on the inner diameter 40 of the spool 32, may be employed in order to achieve the action for expanding and contracting the spring 30 as the cord 34 is coiled and/or uncoiled around the spool 32.

Figure 3:
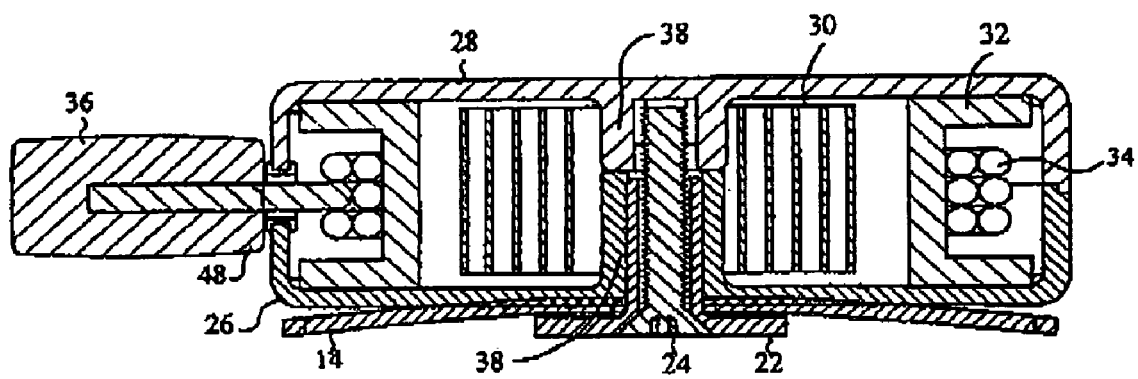
FIG. 3 is a cross section of the present invention.

FIG. 3 is a cross sectional view of the present invention. The straps that are fed through slots in the saddle 14 to configure the harness are not shown in FIG. 3. The cord 34 is fully coiled around the spool 32 and the handle member 36 is flush with the housing 1 when the cord 34 is fully retracted. When the cord 34 is extended, it extends through the opening 48 in the housing 26, 28. In the embodiment shown in FIG. 3, the base portion 26 of the housing is attached to the top portion 28 of the housing by way of the stabilizer post 38 and the fastener 24 is shown as a screw. The saddle 14 is mounted to the housing base portion 26 in a fixed configuration such that it is not easily removed from the saddle. The spring 30 and spool 32 are configured to allow the cord 34 to extend and retract around the spool 32 by pulling on or releasing the handle member 36.

Figure 4:
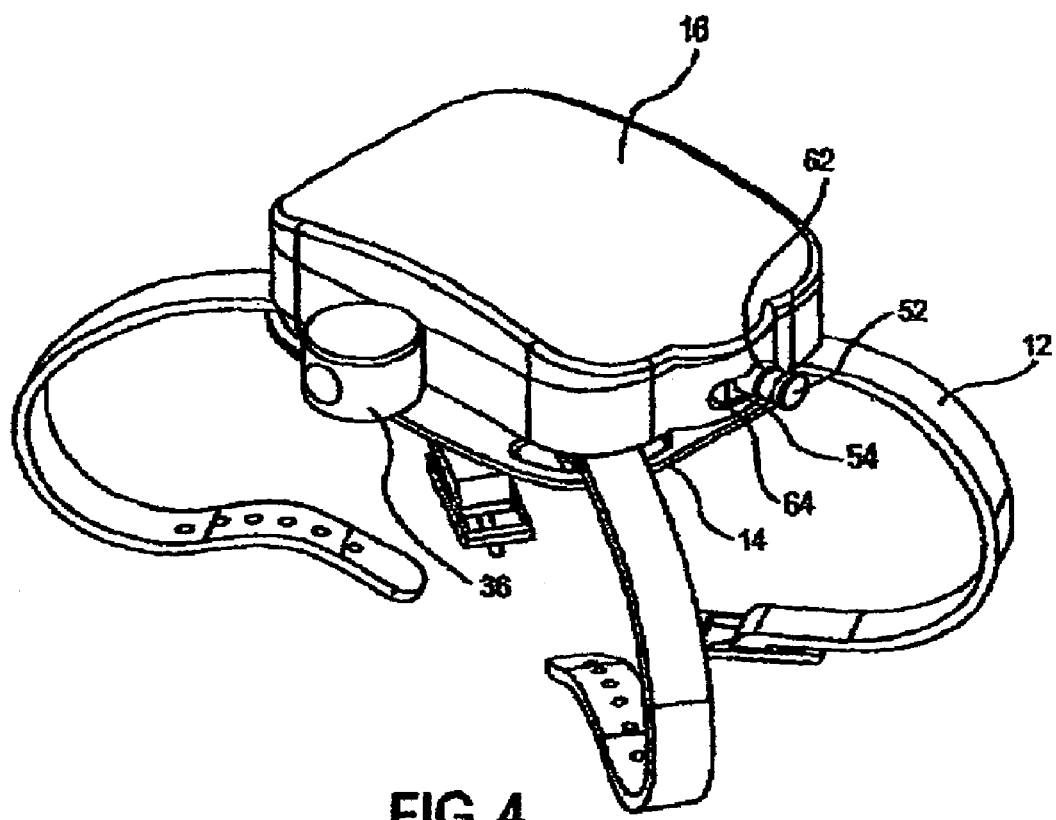
FIG. 4 is an overall view of the harness with a lockable retractable leash system of the present invention.

FIG. 4 shows an embodiment of the present invention that includes a feature that allows a user to lock the leash in place so that it remains extended to a desired length. Like reference numbers in FIGS. 4 through 8 depict like elements discussed with reference to FIGS. 1 through 3. In FIG. 4, a locking mechanism 52 extends out of the housing base portion 26. The housing base portion 26 has a keyhole opening 54 for the locking mechanism 52 to extend through.

Figure 5:
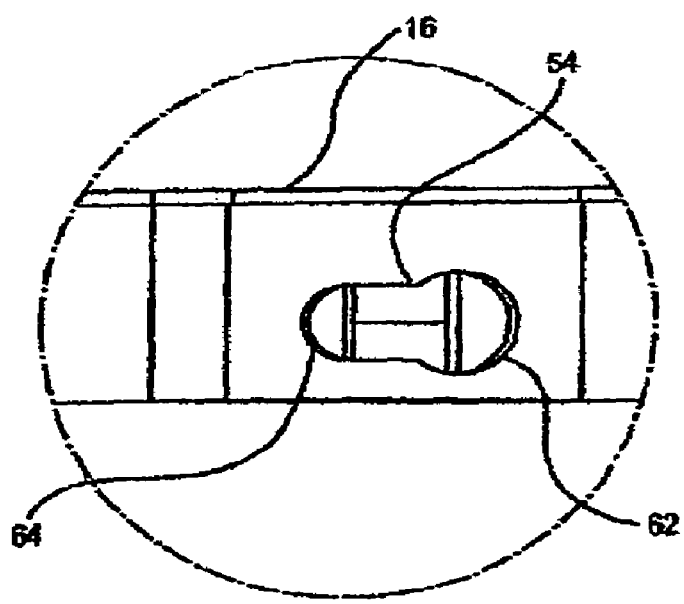
FIG. 5 is a detail of the keyhole in the housing for the lockable retractable leash system.

The detail for the keyhole opening 54 is shown in FIG. 5. The keyhole opening 54 has a large diameter 62 at one end of the opening 54 and a smaller diameter 64 below the large diameter 62 of the opening, such that the opening 54 resembles a keyhole.

Figure 6:
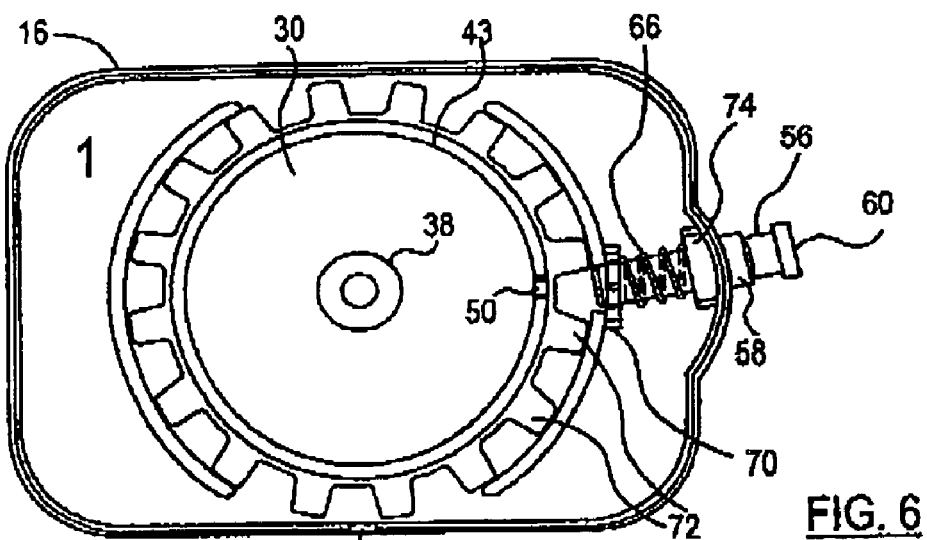
FIG. 6 is a cross section of the lockable retractable leash system in an unlocked position.

Referring now to FIG. 6, the locking mechanism has a first diameter rod 56 and a sleeve portion 58 that is larger in diameter than the rod 56 of the locking mechanism. The sleeve portion 58 is slidable along the rod 56. A spring 66 is concentric to the rod 56 and located below the sleeve portion 58. The rod 56 extends from outside the housing into the housing and is aligned with the spool 32 by way of a guide 70. The spool 32 has a plurality of teeth 72 on the bottom flange 43 for engaging the locking mechanism 52. In FIG. 6, the bottom flange 43 is shown with teeth for engaging the rod 56 but it should be noted that the top flange 41 could also be used with slight modifications to the present invention without departing from the scope of the present invention. The guide 70 is used to align and maintain the path of travel for the rod 56 as it moves into and out of engagement with the plurality of teeth 72 on the spool.

The sleeve portion 58 compresses the spring 66 when the rod 56 is compressed during operation. A flat disc area 60 tops the rod 56 for pushing the rod 56 and hence, the sleeve portion 58 along the rod 56 for operating the locking mechanism.

Referring again to FIG. 4, the pushbutton 60 remains external to the housing at all times. The large diameter 62 of the keyhole opening allows the entire locking mechanism 52 including the pushbutton 60, the first diameter 56 and the sleeve 58 to extend through the opening. A flange 74 on the sleeve 58 remains inside the housing and prevents the sleeve from completely exiting the keyhole opening 54.

FIG. 6 show a cross-section of the present invention in an unlocked position such that the spool is free to rotate within the housing. The rod 56 is fully extended and does not contact the teeth 72 of the spool 32 yet the path of travel for the rod is maintained by the guide 70. The spring 66 is released and the sleeve portion 58 is extended through the keyhole opening.

When the locking mechanism is in a free position, the spool 32 is capable of spinning on demand and the cord (not shown) can be extended to and retracted to any desired length.

Figure 7:
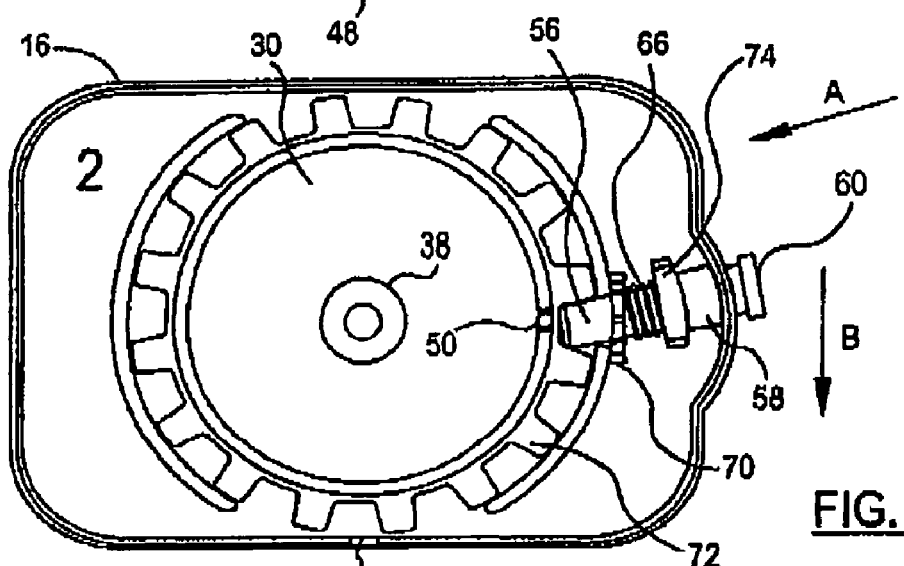
FIG. 7 is a cross section of the lockable retractable leash system as a locked position is being engaged.

To lock the cord to a desired length, the push button 60 is depressed, which pushes the rod 56 further into the housing and moves the slidable sleeve portion 58 further into the housing through the large diameter of the keyhole opening (not shown in FIG. 6). Referring now to FIG. 7 the action of locking the cord to a desired length is shown. The spring 66 is compressed by the sleeve 58. The rod 56 is engaged between two teeth 72 in the spool 32. Once the teeth 72 are engaged with the rod 56, the push button, or flat disc portion 60 is used to slide the rod 56 into the smaller diameter portion of the keyhole opening, thereby preventing the sleeve 58 from exiting the housing. Arrow A shows the action of depressing the button 60, driving the rod 58 into engagement with the teeth 72 of the spool 32 and Arrow B shows the action of sliding the rod 56 and sleeve 58 into the lower portion of the keyhole opening. The locking mechanism is activated and the cord is maintained to a desired length.

Figure 8:
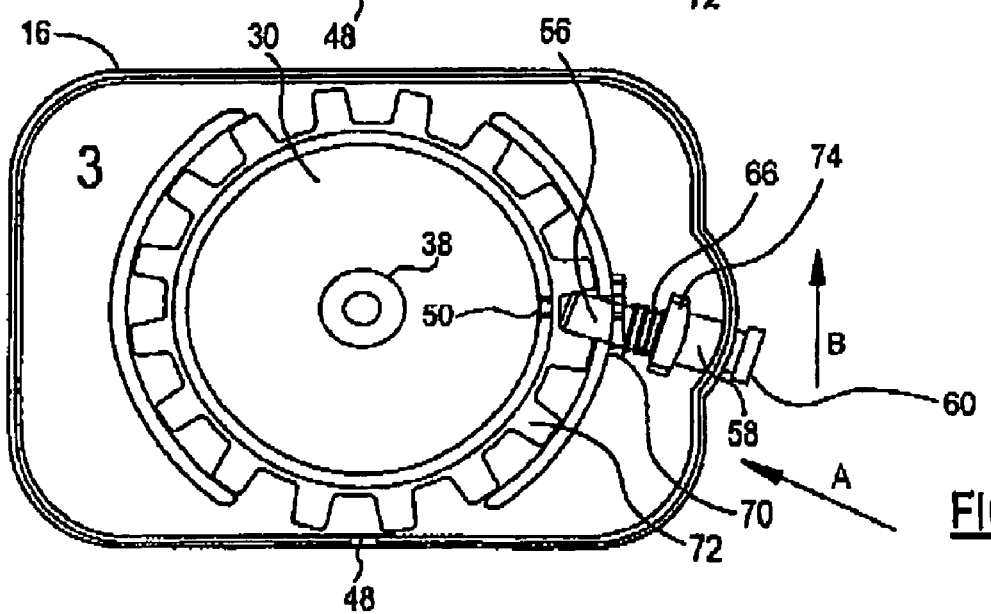
FIG. 8 is a cross section of the lockable retractable leash system in the locked position.

FIG. 8 is a cross-section of the fully locked position. The rod 56 is engaged with the teeth 72, the spring 66 is compressed by the sleeve portion 58 and held in place by the flange 74 as the sleeve portion 58 is prevented from exiting the housing 16.

To unlock the mechanism, the pushbutton 60 is depressed (the action again being shown by Arrow A) releasing the sleeve portion 58 from and the rod 56 is slid up into the larger diameter portion 62 of the keyhole opening (the action being shown by Arrow B), thereby allowing the sleeve 58 to extend out of the housing, and releasing the rod 56 from between teeth 72 of the spool 32 unlocking the locking mechanism. The position of the locking mechanism is again as shown and FIG. 6, thereby allowing the spool to move freely.

The harness having a retractable leash attached thereto is a convenient way for a user to always have a leash available for their pet, without having to carry it around when it is not in use. Furthermore, because the leash is stored in the housing that is mounted on the harness, when it is not being used it is still attached to the animal, yet it remains out of the animal's way and cannot become tangled. The saddle and harness system keeps the housing positioned such that it remains on the animal's back and does not slide under the animal, keeping it both comfortable for the animal and conveniently accessible for the user.

It is to be understood that the preceding description of the preferred embodiment is merely illustrative of some of the many specific embodiments that represent applications of the principles of the present invention. For example, the present invention is not limited to a harness and leash for a small animal. The present invention is adaptable to a variety of animals and sizes, as well as configurations of housings and retractable leash mechanisms without departing from the scope of the present invention. The invention covers all alternatives, modifications, and equivalents, as may be included within the spirit and scope of the appended claims.

What is claimed is:

1. A pet harness comprising:
   an adjustable harness;
   a retractable leash system mounted to the adjustable harness so that the retractable leash is not removable from the adjustable harness: and
   a locking mechanism for maintaining the cord at a predetermined length, the locking mechanism comprising:
   a plurality of teeth on a flange portion of the spool;
   the keyhole opening in the housing having a first diameter portion and a second diameter portion that is smaller in diameter than the first diameter portion;
   a rod having a first end inside the housing and a second end extending through the keyhole opening, the rod being retracted into and extended out of the housing for the locked and unlocked positions respectively;
   a guide at the first end of the rod for guiding movement of the rod into and out of
   a space between two teeth in the plurality of teeth on the spool;
   a slidable sleeve concentric with the rod, the slidable sleeve having a diameter that is larger than the second diameter portion of the locking mechanism;
   a spring concentric with and coiled around the rod, the spring being located behind the slidable sleeve; and
   a disc portion at the second end of the rod for actuating movement of the rod into and out of the space between teeth and between a first position at the first diameter portion of the keyhole opening and a second position at the second diameter portion of the keyhole opening, the first position being the unlocked position and the second position being the locked position.

2. A pet harness as claimed in claim 1 wherein the adjustable harness further comprises:
   a saddle having slots therein; and
   a plurality of straps fed through the slots, the plurality of straps being adjustable in length with fasteners for attaching the saddle to the pet.

3. The pet harness as claimed in claim 2 wherein the retractable leash system further comprises:
   a housing permanently attached to the saddle and containing the retractable leash system; and
   a handle member attached to the retractable leash system and external to the housing at one end of the retractable leash system.

4. The pet harness as claimed in claim 3 wherein the retractable leash system further comprises:
   a housing having first and second portions and an access opening, the first portion of the
   housing being permanently attached to the saddle;
   a spring located in the center of the housing;
   a spool concentric with the spring and being located in the center of the housing;
   a cord coiled around the spool, the spring being expanded by the spool when the cord is extended, the cord being of a predetermined length with first and second ends, the first end of the cord being attached to the spool and the second end of the cord extending through the access opening of the housing and being attached to the handle member; and a second portion of the housing being fixed to the first portion of the housing thereby enclosing all but the handle of the retractable leash system within the housing.

5. The pet harness as claimed in claim 4 wherein said housing further comprises at least one stabilizer post for locating and centering the spring and spool within the housing and aligning the first and second portions of the housing to each other.

6. A pet harness comprising:
   a saddle having a slot in each corner of the saddle;
   a plurality of straps, each strap being fed through the corner slots, each strap in the plurality of straps having a length that is adjustable by a fastener to a predetermined size to accommodate a size of the pet;
   a housing fixed to the saddle;
   a first coiled spring located in the center of the housing;

a spool centered in the housing and surrounding the first coiled spring, the spool having a top portion, a base portion and a center portion, the base portion of the spool having a plurality of teeth, the center portion of the spool having an inner diameter and an outer diameter, the inner diameter of the spool having a catch member in contact with an end of the first coiled spring;

a cord having a predetermined length with first and second ends. the first end of the cord being attached to the spool and the second end of the cord extending through an access opening of the housing and being attached to the handle member, the cord being coiled around the outer diameter of the center portion of the spool, the first coiled spring is expanded within the inner diameter of the center portion of the spool by the catch member as the cord is extended out of the housing;

a keyhole opening in the housing having a first diameter portion and a second diameter portion that is smaller in diameter than the first diameter portion;

a rod having a first end inside the housing and a second end extending through the keyhole opening, the rod being operable to retract into and extend out of the housing;

a guide at the first end of the rod for guiding movement of the rod into and out of a space between two teeth in the plurality of teeth on the spool;

a sleeve member concentric with the rod, the sleeve member having a diameter that is larger than the second diameter portion of the keyhole opening and being slidable along the rod, the sleeve member having a flange at one end;

a second spring concentric with and coiled around the rod, the second spring being located between the guide and the sleeve such that the second spring is in contact with the flange at one end of the sleeve; and a disc portion at the second end of the rod for compressing the second spring below the sleeve and actuating movement of the rod into and out of the space between teeth and between a first position at the first diameter portion of the keyhole opening and a second position at the second diameter portion of the keyhole opening, the first position being an unlocked position and the second position being the locked position whereby in the unlocked position the sleeve partially extends out of the housing and the rod is in the first diameter portion of the keyhole opening, in the unlocked position the spool rotates freely in the housing, in the locked position the rod is in contact with the space between two teeth and positioned at the second diameter portion of the keyhole opening, the second spring is compressed and the sleeve is fully within the housing, the sleeve is prevented from extending out of the housing by the second diameter portion of the keyhole opening, the spool is prevented from rotating within the housing thereby maintaining the cord at a predetermined length.

\* \* \* \* \*